US012769111B2

(12) United States Patent
Takagi et al.

(10) Patent No.: US 12,769,111 B2
(45) Date of Patent: Oct. 20, 2026

(54) WAVELENGTH VARIABLE INTERFERENCE FILTER

(71) Applicant: SEIKO EPSON CORPORATION, Tokyo (JP)

(72) Inventors: Kengo Takagi, Matsumoto (JP); Tsuyoshi Miyashita, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/618,121

(22) Filed: Mar. 27, 2024

(65) Prior Publication Data

US 2025/0251585 A1 Aug. 7, 2025

(30) Foreign Application Priority Data

Mar. 29, 2023 (JP) ................................ 2023-052903

(51) Int. Cl.
*G02B 26/00* (2006.01)

(52) U.S. Cl.
CPC ................................ *G02B 26/001* (2013.01)

(58) Field of Classification Search
CPC .......... G02B 26/001; G02B 5/08; G02B 5/28; G02B 26/04; G02B 26/00; G02B 5/284; G01J 3/26
USPC ....... 359/578, 579, 577, 589, 585, 581, 582, 359/290
See application file for complete search history.

(56) References Cited

U.S. PATENT DOCUMENTS

| | | | | |
|---|---|---|---|---|
| 2011/0194118 A1* | 8/2011 | Hirokubo | G02B 26/001 | 156/154 |
| 2012/0206731 A1* | 8/2012 | Sano | G01J 3/26 | 356/450 |
| 2012/0212822 A1* | 8/2012 | Kitahara | G01J 3/51 | 359/578 |
| 2013/0044377 A1* | 2/2013 | Nishimura | G02B 26/06 | 359/578 |
| 2014/0092478 A1* | 4/2014 | Shinto | G02B 5/28 | 359/578 |
| 2014/0268344 A1* | 9/2014 | Arakawa | G02B 26/001 | 359/580 |
| 2014/0268345 A1* | 9/2014 | Sano | G02B 26/0841 | 359/584 |

FOREIGN PATENT DOCUMENTS

JP 2021021813 A 2/2021

* cited by examiner

*Primary Examiner* — William R Alexander
*Assistant Examiner* — Kuei-Jen L Edenfield
(74) *Attorney, Agent, or Firm* — CHIP LAW GROUP

(57) ABSTRACT

A wavelength variable interference filter includes a first substrate, a second substrate facing the first substrate, a first reflective film provided on the first substrate, and a second reflective film provided on the second substrate and facing the first reflective film via a gap. The second substrate includes a diaphragm substrate having a uniform thickness in a Z direction and a support substrate bonded to the diaphragm substrate. The support substrate includes a movable portion overlapping the first reflective film and the second reflective film, and a support portion provided along an outer peripheral edge of the second substrate, and a hole portion for exposing the diaphragm substrate is provided between the movable portion and the support portion.

9 Claims, 10 Drawing Sheets

WAVELENGTH VARIABLE INTERFERENCE FILTER

The present application is based on, and claims priority from JP Application Serial Number 2023-052903, filed Mar. 29, 2023, the disclosure of which is hereby incorporated by reference herein in its entirety.

BACKGROUND

1. Technical Field

The present disclosure relates to a wavelength variable interference filter.

2. Related Art

In the related art, there is known a wavelength variable interference filter including a first mirror provided on a first substrate and a second mirror provided on a second substrate, in which the first mirror and the second mirror are disposed to face each other with a gap interposed therebetween (see, for example, JP-A-2021-21813).

In the wavelength variable interference filter described in JP-A-2021-21813, an annular recessed groove formed by wet etching is formed in an outer periphery of a movable portion on which the first mirror is provided in the first substrate, and a bottom portion of the recessed groove functions as a diaphragm. In such a configuration, by bending the diaphragm portion, the first mirror can be displaced toward the second mirror while preventing bending of the first mirror.

JP-A-2021-21813 is an example of the related art.

However, when the recessed groove is formed by the wet etching as in JP-A-2021-21813, a curved surface portion having an arc-shaped cross section is formed on an outer periphery of the bottom portion of the recessed groove serving as the diaphragm portion by side etching. That is, the curved surface portion is formed between the movable portion and the diaphragm portion and between the diaphragm portion and a substrate outer peripheral portion. Therefore, there is a problem that a relative size of the entire wavelength variable interference filter with respect to a planar size of the movable portion is large. That is, when a size of the movable portion on which a mirror is disposed is fixed (normalized) to a predetermined size, the size of the wavelength variable interference filter is increased by an amount of the curved surface portion. When the size of the wavelength variable interference filter is fixed (normalized) to a predetermined size, it is necessary to reduce the size of the movable portion, on which the mirror is disposed, by the amount of the curved surface portion.

SUMMARY

A wavelength variable interference filter according to an aspect of the present disclosure includes: a first substrate having a light-transmitting property; a second substrate facing the first substrate and having a light-transmitting property; a first reflective film provided on a surface of the first substrate facing the second substrate; and a second reflective film provided on the second substrate and facing the first reflective film via a gap. A direction from the first substrate toward the second substrate is defined as a thickness direction. The second substrate includes a diaphragm substrate having a uniform thickness in the thickness direction and a support substrate bonded to the diaphragm substrate in the thickness direction. The support substrate includes a movable portion overlapping the first reflective film and the second reflective film when viewed from the thickness direction, and a support portion provided along an outer peripheral edge of the second substrate, and a hole portion for exposing the diaphragm substrate is provided between the movable portion and the support portion.

DESCRIPTION OF EMBODIMENTS

First Embodiment

Hereinafter, a first embodiment of the present disclosure will be described.

Figure 1:
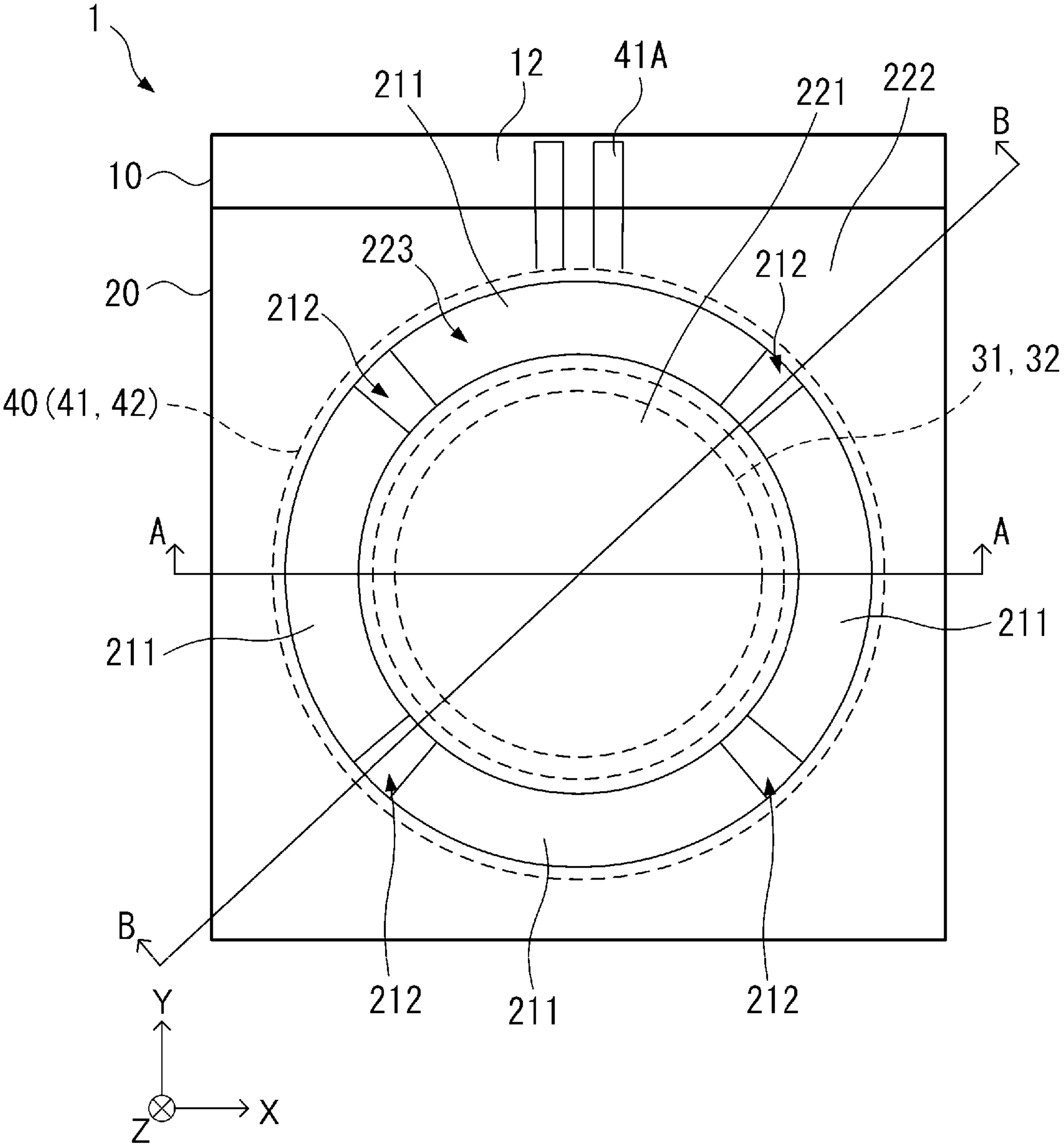
FIG. 1 is a plan view showing a schematic configuration of a wavelength variable interference filter according to a first embodiment.
Figure 2:
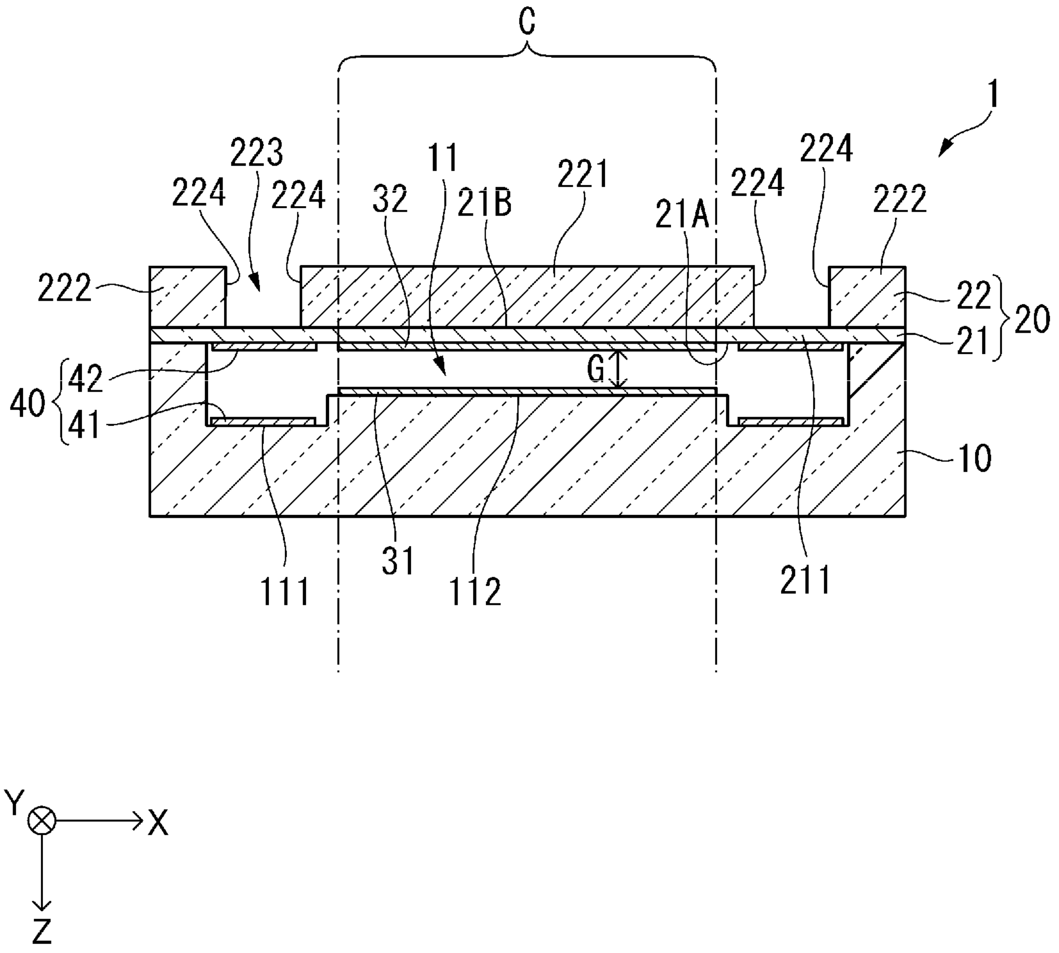
FIG. 2 is a cross-sectional view of the wavelength variable interference filter in FIG. 1 taken along a line A-A.
Figure 3:
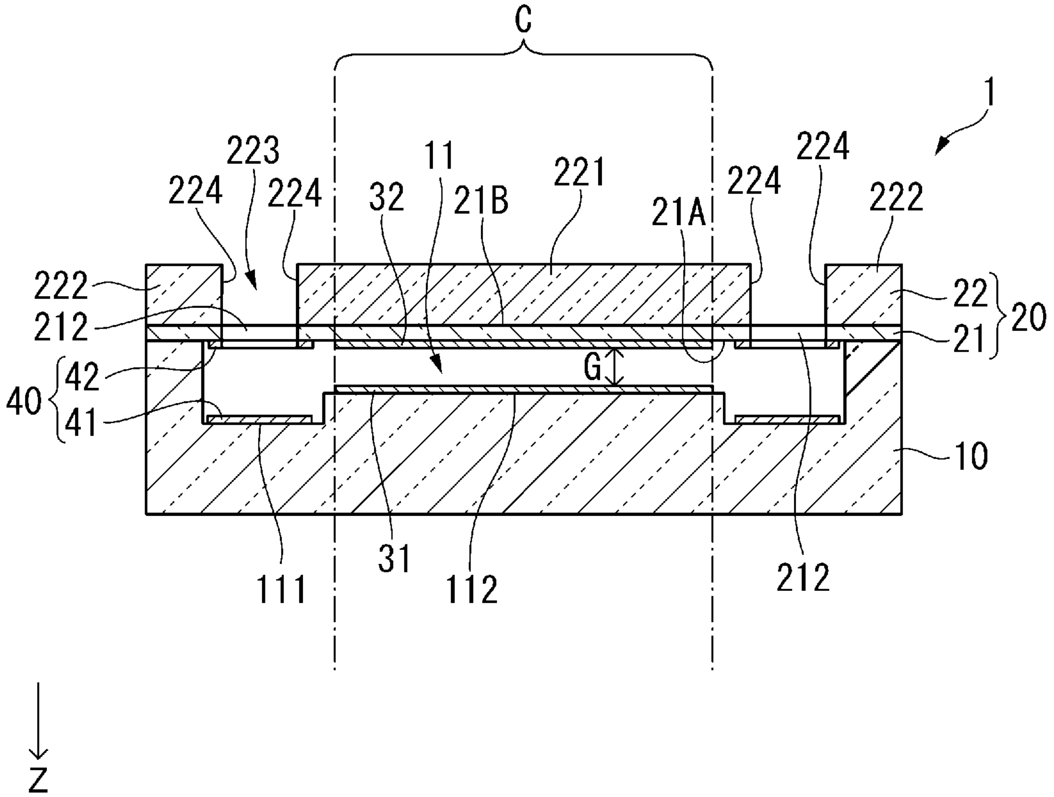
FIG. 3 is a cross-sectional view of the wavelength variable interference filter in FIG. 1 taken along a line B-B.

FIG. 1 is a plan view showing a schematic configuration of a wavelength variable interference filter 1 according to the first embodiment, FIG. 2 is a cross-sectional view of the wavelength variable interference filter 1 taken along a line A-A, and FIG. 3 is a cross-sectional view of the wavelength variable interference filter 1 taken along a line B-B.

The wavelength variable interference filter 1 according to the embodiment is a Fabry-Perot etalon filter that selectively emits light having a predetermined spectral wavelength from incident light, and can change the wavelength (spectral wavelength) of the emitted light.

Overall Configuration of Wavelength Variable Interference Filter 1

As shown in FIGS. 1 to 3, the wavelength variable interference filter 1 includes a first substrate 10, a second substrate 20, a first reflective film 31, a second reflective film 32, and a driving unit 40.

The first substrate 10 and the second substrate 20 are disposed in parallel to face each other, and are bonded to each other.

The first reflective film 31 is provided on a surface of the first substrate 10 facing the second substrate 20.

The second reflective film 32 is provided on a surface of the second substrate 20 facing the first substrate 10. The first reflective film 31 and the second reflective film 32 face each other via a gap G (see FIGS. 2 and 3).

The driving unit 40 displaces the second substrate 20 toward the first substrate 10 to change a dimension of the gap G between the first reflective film 31 and the second reflective film 32.

Hereinafter, each configuration of the wavelength variable interference filter 1 will be described in detail.

In the following description, a direction from the first substrate 10 toward the second substrate 20 is defined as a Z direction, one direction orthogonal to the Z direction is defined as an X direction, and a direction orthogonal to the Z direction and the X direction is defined as a Y direction. The Z direction corresponds to a thickness direction in the present disclosure. A plan view when viewed from the Z direction may be simply referred to as a plan view.

Configurations of First Substrate 10, First Reflective Film 31, and First Electrode 41

The first substrate 10 is a substrate having a light-transmitting property with respect to a wavelength region of light transmitted through the wavelength variable interference filter 1. For example, when light in a visible light region is transmitted, a transparent substrate such as sapphire glass can be used.

An outer shape of the first substrate 10 in the plan view is not particularly limited, and a rectangular shape is preferably formed when the first substrate 10 in a chip unit is cut out from a substrate serving as a material by laser cutting or the like in a manufacturing process. A thickness of the first substrate 10 is not particularly limited as long as the first substrate 10 has such a thickness that does not cause bending due to a film stress of the first reflective film 31 or the like formed at the first substrate 10.

As shown in FIGS. 2 and 3, the first substrate 10 is provided with a recessed groove 11 formed by etching or the like on the surface facing the second substrate 20.

The recessed groove 11 includes a central portion 112 and an electrode groove 111 surrounding an outer periphery of the ce006Etral portion 112. A surface of the central portion 112 facing the second substrate 20 is a planar surface, on which the first reflective film 31 is provided.

The electrode groove 111 is a groove surrounding the outer periphery of the central portion 112, and has a bottom portion having a planar surface. The first electrode 41 constituting the driving unit 40 is provided in the electrode groove 111.

An extraction groove (not shown) for forming a first extraction electrode 41A (see FIG. 1), which is a wiring electrode of the first electrode 41 disposed in the electrode groove 111, is further provided from the electrode groove 111 toward an outer peripheral edge of the first substrate 10.

As shown in FIG. 1, a part of the first substrate 10 may protrude outward from an outer peripheral edge of the second substrate 20 to constitute an electrical equipment unit 12 in which electrodes provided in the extraction grooves are exposed. In this case, the electrodes exposed from the electrical equipment unit 12 can be electrically coupled more easily by wire bonding or FPC coupling.

As described above, the first reflective film 31 is provided on the central portion 112 of the recessed groove 11 of the first substrate 10. The first reflective film 31 can be formed of, for example, a metal film of Ag or the like, an alloy film of an Ag alloy or the like, and a dielectric multilayer film in which a high refraction layer (for example, $TiO_2$) and a low refraction layer (for example, $SiO_2$) are stacked. In the embodiment, an example in which the first reflective film 31 has a circular shape in the plan view is shown, but the shape of the first reflective film 31 is not particularly limited, and may be a rectangular shape, another polygonal shape, or an elliptical shape.

For example, the first electrode 41 is formed in a circular ring shape along the electrode groove 111. In addition, the first electrode 41 may be formed in a substantially C-shape in which a part of the circular ring shape is cut out, and in this case, a wiring coupled to the first reflective film 31 may be separately formed from the cut-out portion.

The first electrode 41 and a second electrode 42 provided on the second substrate 20 constitute the driving unit 40. Specifically, the first electrode 41 faces the second electrode 42 provided on the second substrate 20 via a predetermined gap, which constitute an electrostatic actuator as the driving unit 40.

The first extraction electrode 41A is coupled to a part of the first electrode 41, and the first extraction electrode 41A extends to the electrical equipment unit 12 along the extraction groove (not shown), and a signal can be input to the first electrode 41 via the first extraction electrode 41A.

Configurations of Second Substrate 20, Second Reflective Film 32, and Second Electrode 42

As shown in FIGS. 2 and 3, the second substrate 20 includes a diaphragm substrate 21 and a support substrate 22, and the diaphragm substrate 21 and the support substrate 22 are stacked in the Z direction and bonded to each other. An outer shape of the second substrate 20 in the plan view when viewed from the Z direction is not particularly limited, and a rectangular shape is preferably formed similar to the first substrate 10.

In the embodiment, the diaphragm substrate 21 is disposed on a side facing the first substrate 10, and the support substrate 22 is bonded to a side of the diaphragm substrate 21 opposite to the first substrate 10. The diaphragm substrate 21 and the support substrate 22 are each a substrate having a light-transmitting property with respect to the wavelength region of light transmitted through the wavelength variable interference filter 1. For example, when light in a visible light region is transmitted, a transparent substrate such as sapphire glass can be used. The diaphragm substrate 21 and the support substrate 22 are preferably made of the same material. Even when different materials are used for the diaphragm substrate 21 and the support substrate 22, it is preferable that refractive indices are substantially the same. Here, the expression "refractive indices are substantially the same" means a range in which light reflection at an interface between the diaphragm substrate 21 and the support substrate 22 is within an allowable error for the purpose of use of the wavelength variable interference filter 1.

The diaphragm substrate 21 is a planar plate-shaped member, and has a thickness smaller than that of the support substrate 22.

A surface (facing surface 21A) of the diaphragm substrate 21 facing the first substrate 10 and a surface (bonding surface 21B) on the side opposite to the first substrate 10 are each processed into a smooth planar surface by surface polishing, and a surface roughness is, for example, 1 nm or less.

The second reflective film 32 and the second electrode 42 constituting the driving unit 40 are provided on the facing surface 21A of the diaphragm substrate 21.

Although details will be described later, a part of the diaphragm substrate 21 is exposed from a hole portion 223, which will be described later, provided in the support substrate 22, and constitutes a flexible portion 211. The flexible portion 211 is a portion that is bent and deformed when the second reflective film 32 is displaced toward the first reflective film 31 by the driving unit 40.

Here, in the embodiment, a movable portion 221 has a circular shape in the plan view, and four flexible portions 211 each having a substantially arc shape are rotationally symmetrically provided to surround an outer periphery of the movable portion 221. A through hole 212 (see FIGS. 1 and 3) penetrating the diaphragm substrate 21 is provided between the adjacent flexible portions 211.

In the embodiment, as described above, the second reflective film 32 provided on the movable portion 221 is displaced toward the first reflective film 31 by the bending of the flexible portion 211, but at this time, since the through hole 212 is provided, distortion due to the bending of the flexible portion 211 can be absorbed, and the flexible portion 211 is more easily bent.

The support substrate 22 is a substrate bonded to the diaphragm substrate 21 and has a thickness sufficiently larger than that of the diaphragm substrate 21. A surface of the support substrate 22 facing the diaphragm substrate 21 and a surface of the support substrate 22 on the side opposite to the diaphragm substrate 21 are each formed as a smooth planar surface by surface polishing. The surfaces of the support substrate 22 on the ±Z side are formed to have a surface roughness of, for example, 1 nm or less.

As shown in FIGS. 1 to 3, the support substrate 22 includes the movable portion 221 and a support portion 222.

The movable portion 221 is provided at a position overlapping the second reflective film 32 in a central portion of the support substrate 22 in the plan view when viewed from the Z direction. In the embodiment, the movable portion 221 is formed in a circular shape in the plan view. The shape is not limited thereto, and may be a polygonal shape such as a rectangular shape or an elliptical shape. For example, when the movable portion 221 has a rectangular shape, the flexible portion 211 of the diaphragm substrate 21 may also be formed in a rectangular frame shape surrounding an outer periphery of the movable portion 221. In this case, a stress concentrates on a rectangular corner portion, and a deformation amount of the flexible portion 211 changes depending on the position. However, by providing the through hole 212 in a corner portion of the rectangular frame shape, the stress can be absorbed, and the deflection of the flexible portion 211 can be made uniform.

The support portion 222 is provided outside an outer peripheral edge of the movable portion 221 in the plan view when viewed from the Z direction, and forms the outer peripheral edge of the second substrate 20. The movable portion 221 and the support portion 222 may be formed to have different thicknesses, and are preferably formed to have the same thickness in the manufacturing process.

The hole portion 223 is provided between the movable portion 221 and the support portion 222 and penetrates the support substrate 22 in the Z direction in a state of not being bonded to the diaphragm substrate 21. Accordingly, in a state in which the support substrate 22 is bonded to the diaphragm substrate 21, a part of the diaphragm substrate 21 is exposed from the hole portion 223.

An inner peripheral edge of the support portion 222 facing the movable portion 221 has a uniform distance from the outer peripheral edge of the movable portion 221. That is, the hole portion 223 is formed in a circular ring shape surrounding the movable portion 221.

A portion of the diaphragm substrate 21 exposed from the hole portion 223 constitutes the flexible portion 211. The flexible portion 211 is a portion that bends toward the first substrate 10 when the second reflective film 32 is displaced toward the first reflective film 31 by the driving unit 40. That is, in the embodiment, in the diaphragm substrate 21, the flexible portion 211 exposed from the hole portion 223 is bent toward the first substrate 10, and a portion overlapping the movable portion 221 and the support portion 222 is not bent (is not deformed) due to rigidity of the support substrate 22, and is in a state of maintaining parallel to the first substrate 10.

Accordingly, the second reflective film 32 provided on the movable portion 221 can be displaced toward the first substrate 10 in a state of maintaining parallel to the first reflective film 31.

Here, in the embodiment, a side wall 224 of the hole portion 223 intersects with ±Z side surfaces (a surface facing the diaphragm substrate 21 and a surface on the side opposite to the diaphragm substrate 21) of the support substrate 22 and is parallel to the Z direction. That is, the side wall 224 of the hole portion 223 is orthogonal to the diaphragm substrate 21. Accordingly, the outer peripheral edge of the surface of the movable portion 221 on the diaphragm substrate 21 side coincides with the outer peripheral edge of the surface of the movable portion 221 on the side opposite to the diaphragm substrate 21 in the plan view when viewed from the Z direction. Similarly, the inner peripheral edge of the surface of the support portion 222 on the diaphragm substrate 21 side coincides with an inner peripheral edge of the surface of the movable portion 221 on the side opposite to the diaphragm substrate 21 in the plan view when viewed from the Z direction.

In the embodiment, since the inner peripheral edge of the support portion 222 facing the movable portion 221 has a uniform distance from the outer peripheral edge of the movable portion 221, a distance between a boundary of the flexible portion 211 on the movable portion 221 side and a boundary of the flexible portion 211 on the support portion 222 side is also uniform. Therefore, the bending of the flexible portion 211 when the second reflective film 32 is displaced toward the first reflective film 31 is uniform in a periphery direction, and the first reflective film 31 and the second reflective film 32 can be maintained parallel to each other.

For bonding the diaphragm substrate 21 and the support substrate 22, it is preferable to use a bonding method capable of reducing light reflection at the interface between the diaphragm substrate 21 and the movable portion 221 in at least a region (optical region C) overlapping the first reflective film 31 and the second reflective film 32. That is, when the movable portion 221 and the diaphragm substrate 21 are bonded by a bonding layer having a refractive index greatly different from that of the substrates, light reflection occurs at the interface, and a loss of light transmitted through the wavelength variable interference filter 1 occurs.

In the embodiment, the diaphragm substrate 21 and the support substrate 22 are bonded using a bonding layer having a refractive index substantially the same as that of the diaphragm substrate 21 and the support substrate 22. When a glass material is used for the diaphragm substrate 21 and the support substrate 22, it is preferable to use low-melting-point glass for bonding. The low-melting-point glass is formed by adding a metal oxide such as PbO or SnO to $B_2O_3$-based glass or $SiO_2$-based glass, and a refractive index and a melting point change depending on an addition amount. For example, in the embodiment, the diaphragm substrate 21 and the support substrate 22 are formed of sapphire glass. In this case, the addition amount of the metal oxide may be determined such that the refractive index approximates a refractive index (1.73) of the sapphire glass. Since a melting point of the sapphire glass is 2040° C., which is very high, there is no inconvenience that the diaphragm substrate 21 and the support substrate 22 are deformed due to softening or the like of the molten low-melting-point glass.

Even when another material such as quartz glass is used for the diaphragm substrate 21 and the support substrate 22, low-melting-point glass having a refractive index substantially the same as that of the material and a melting point lower than that of f the material may be appropriately selected. Here, "substantially the same" includes that the refractive indices are the same and that a difference between the refractive indices is within an allowable error. The allowable error is a range in which a decrease in the amount of light transmitted through the wavelength variable interference filter 1 is equal to or less than a preset allowable amount.

Although the bonding layer (low-melting-point glass) between the diaphragm substrate 21 and the support substrate 22 in the embodiment is not shown, a bonding layer may be provided on a bonding portion of the support substrate 22, that is, the movable portion 221 and the support portion 222.

As described above, the second reflective film 32 is provided on the facing surface 21A of the diaphragm substrate 21 at a portion overlapping the movable portion 221 in the plan view. Accordingly, the second reflective film 32 faces the first reflective film 31 via the gap G.

The second reflective film 32 can be a reflective film having a configuration the same as that of the first reflective film 31 described above, and for example, a metal film of Ag or the like, an alloy film of an Ag alloy or the like, and a dielectric multilayer film in which a high refraction layer (for example, $TiO_2$) and a low refraction layer (for example, $SiO_2$) are stacked can be used.

In the embodiment, the second reflective film 32 is formed in a shape the same as that of the first reflective film 31 in the plan view, and the first reflective film 31 and the second reflective film 32 overlap each other in the plan view when viewed from the Z direction. The region in which the first reflective film 31 and the second reflective film 32 overlap each other is the optical region C. Light incident on the optical region C is multiply reflected between the first reflective film 31 and the second reflective film 32, and light having a predetermined spectral wavelength corresponding to the dimension of the gap G is more intensified by interference and transmitted through the wavelength variable interference filter 1.

As described above, the second electrode 42 and the first electrode 41 constitute the electrostatic actuator serving as the driving unit 40. That is, the second electrode 42 is disposed on the facing surface 21A of the diaphragm substrate 21 to face the first electrode 41 via a predetermined gap.

Here, in the embodiment, an example is shown in which the second electrode 42 and the first electrode 41 have the same shape in the plan view when viewed from the Z direction, and the outer peripheral edge of the second electrode 42 overlaps the outer peripheral edge of the first electrode 41 in a state in which the diaphragm substrate 21 is not bent, but the embodiment is not limited thereto.

For example, the second electrode 42 may be formed larger than the first electrode 41, and the first electrode 41 may be formed larger than the second electrode 42. When either one is formed to be larger than the other, even when the diaphragm substrate 21 is bent toward the first substrate 10 and the second electrode 42 is inclined or displaced, the diaphragm substrate 21 overlaps the first electrode 41. Accordingly, an electrostatic attraction force can be continuously applied.

In the embodiment, as shown in FIG. 2, the second electrode 42 is formed to extend from the movable portion 221 to the support portion 222, that is, to cover the entire flexible portion 211 exposed from the hole portion 223.

A second extraction electrode 42A is coupled to a portion of the second electrode 42, and the second extraction electrode 42A extends to the electrical equipment unit 12 via a bump electrode (not shown) provided in the extraction groove of the first substrate 10. Accordingly, a signal can be input to the second electrode 42 via the second extraction electrode 42A extending from the electrical equipment unit 12.

Method of Manufacturing Wavelength Variable Interference Filter 1

Figure 4:
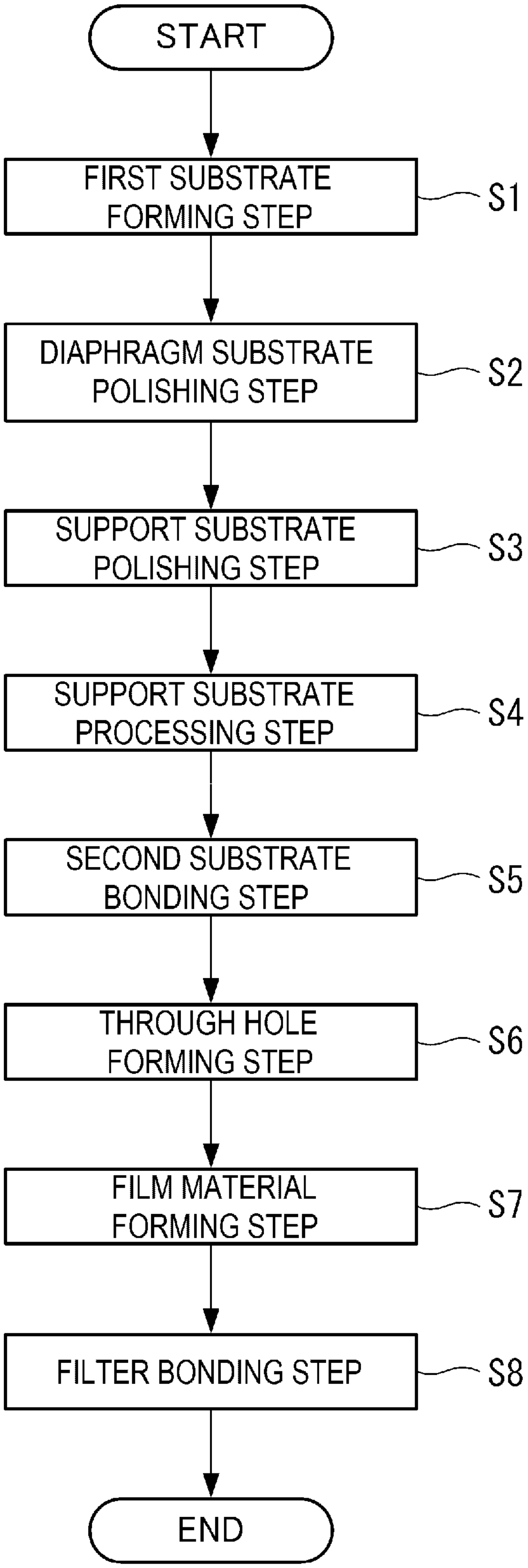
FIG. 4 flowchart showing is a method of manufacturing the wavelength variable interference filter according to the first embodiment.

FIG. 4 is a flowchart showing a method of manufacturing the wavelength variable interference filter 1.

In manufacturing the wavelength variable interference filter 1, as shown in FIG. 3, a first substrate forming step (step S1), a diaphragm substrate polishing step (step S2), a support substrate polishing step (step S3), a support substrate processing step (step S4), a second substrate bonding step (step S5), a through hole forming step (step S6), a film material forming step (step S7), and a filter bonding step (step S8) are performed.

In step S1, a mother material substrate (for example, a glass substrate) as a material is processed to form the recessed groove 11 and the electrical equipment unit 12. The recessed groove 11 can be formed by, for example, wet etching, dry etching, laser processing, or the like.

After the first substrate 10 is formed, an electrode material is formed by using a vapor deposition method, a sputtering method, or the like, and the electrode material is patterned by etching to form the first electrode 41 on the first substrate 10.

Further, the first reflective film 31 is formed at the first substrate 10. For example, when the first reflective film 31 is formed of an alloy film such as an Ag alloy or a metal film, a metal film or an alloy film of a reflective film material is formed at the first substrate 10 by a vapor deposition method, a sputtering method, or the like, and patterning is performed by etching. When the first reflective film 31 is formed of a dielectric multilayer film, a lift off pattern is formed at a position other than the position where the reflective film is provided, and then the dielectric multilayer film is formed.

Unnecessary portions are removed by a lift off step to form the first reflective film 31 formed of the dielectric multilayer film.

By forming the first reflective film 31 after the first electrode 41, deterioration of the first reflective film 31 can be prevented.

Next, a second substrate is formed by step S2 to step S7.

Figure 5:
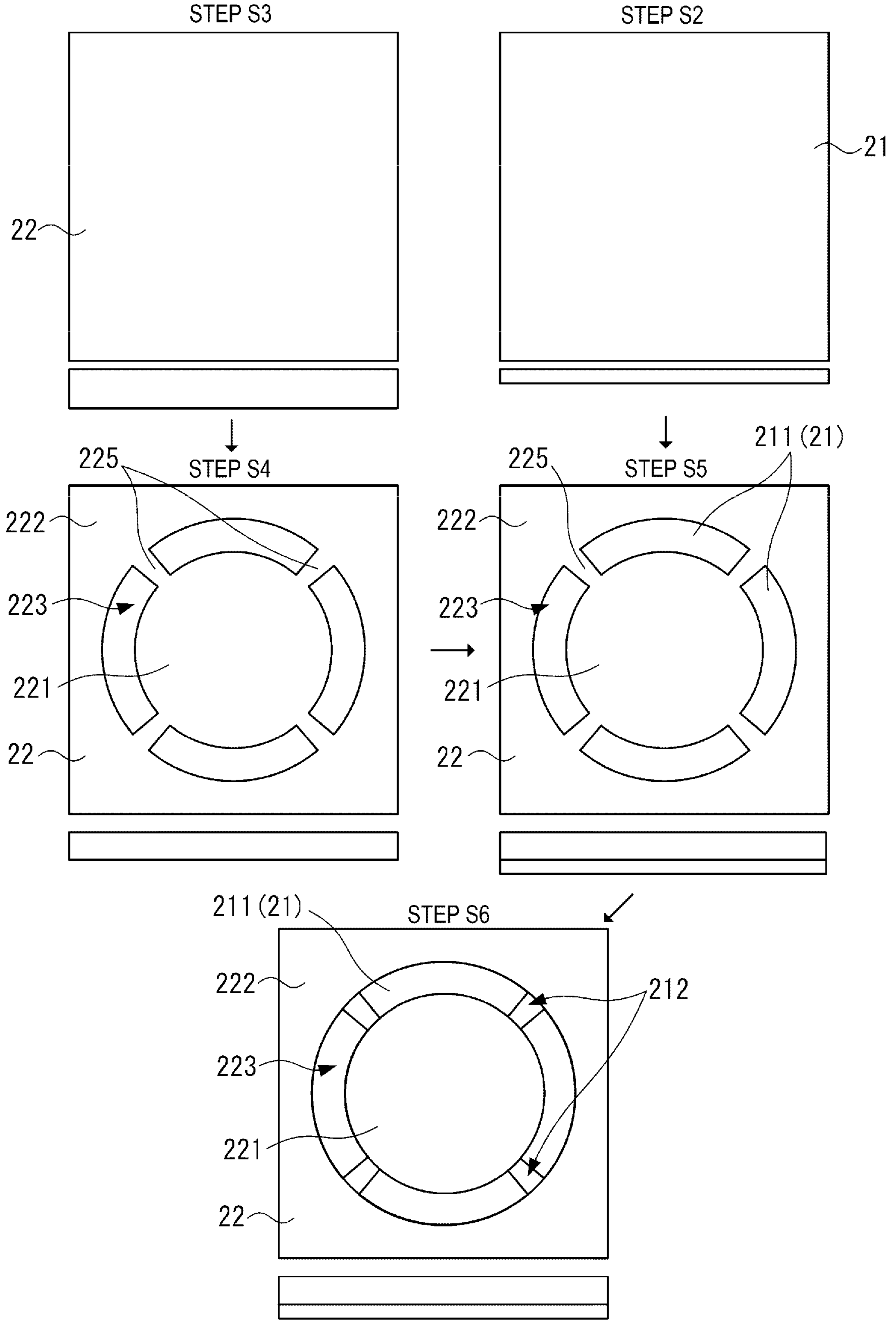
FIG. 5 is a diagram showing states of a diaphragm substrate and a support substrate from step S2 to step S6 in FIG. 4.

FIG. 5 is a diagram showing states of the diaphragm substrate 21 and the support substrate 22 from step S2 to step S6.

In step S2, the mother material substrate (for example, sapphire glass) of the diaphragm substrate 21 is polished to a predetermined thickness dimension (for example, 50 μm). By using the sapphire glass, the diaphragm substrate 21 having a smooth surface with a surface roughness of 1 nm or less can be formed.

In step S3, the mother material substrate (for example, sapphire glass) of the support substrate 22 is polished to a predetermined thickness dimension (for example, 200 μm). Similar to the diaphragm substrate 21, by using sapphire glass, the support substrate 22 having a smooth surface with a surface roughness of 1 nm or less can be formed.

Next, in step S4, the movable portion 221 and the support portion 222 are formed by forming the hole portion 223 penetrating the support substrate 22 in the Z direction. In the embodiment, the hole portion 223 is formed in the support substrate 22 by laser cutting. Accordingly, the hole portion 223 having the side wall 224 parallel to the Z direction can be formed.

In this case, it is preferable to provide a coupling portion 225 that couples the movable portion 221 and the support portion 222 such that the movable portion 221 and the support portion 222 are not separated from each other. The coupling portion 225 is formed at a position corresponding to the through hole 212 of the diaphragm substrate 21. The coupling portion 225 may be provided at a position other than the position corresponding to the through hole 212, but the coupling portion 225 needs to be removed by, for example, dry etching. In this case, a thickness of the flexible portion 211 may not be uniform due to over etching. Regarding this, when the coupling portion 225 is provided at the formation position of the through hole 212, the coupling portion 225 and the diaphragm substrate 21 immediately below the coupling portion 225 can be simultaneously cut and removed by, for example, laser cutting.

Step S2 and step S3 and step S4 may be performed in a reverse order.

Thereafter, in step S5, the diaphragm substrate 21 and the support substrate 22 are bonded to each other.

In the embodiment, the diaphragm substrate 21 and the support substrate 22 are bonded to each other using low dielectric glass as described above. Accordingly, a difference in refractive index of light at a bonding surface between the diaphragm substrate 21 and the support substrate 22 is reduced, and a loss of light transmitted through the optical region C can be reduced.

Since the coupling portion 225 is provided, the position of the movable portion 221 with respect to the support portion 222 is not shifted, and the movable portion 221 can be bonded to a desired position.

The bonding between the diaphragm substrate 21 and the support substrate 22 is not limited thereto, and other examples thereof will be described in the following embodiments.

Thereafter, in step S6, the through hole 212 is formed.

In the through hole 212, the support substrate 22 and the diaphragm substrate 21 at the position of the coupling portion 225 are removed by, for example, laser cutting.

Then, in step S7, the second reflective film 32 and the second electrode 42 are formed at the facing surface 21A of the diaphragm substrate 21. The formation of the second reflective film 32 and the second electrode 42 is similar to the formation of the first reflective film 31 and the first electrode 41 on the first substrate 10.

That is, first, the first electrode 41 is formed to extend from a position overlapping the movable portion 221 to a position overlapping the support portion 222 to cover the flexible portion 211. Thereafter, the second reflective film 32 is formed.

An order of the first substrate forming step of step S1 and the formation of the second substrate of step S2 to step S7 may be reversed.

Thereafter, in step S8, the first substrate 10 and the second substrate 20 are bonded to each other. A method for bonding the first substrate 10 to the second substrate 20 is not particularly limited, and for example, a plasma polymerization film containing siloxane as a main component can be used, and in addition, bonding may be performed using an adhesive such as an epoxy resin.

Comparison Between Embodiment and Comparative Example

Figure 6:
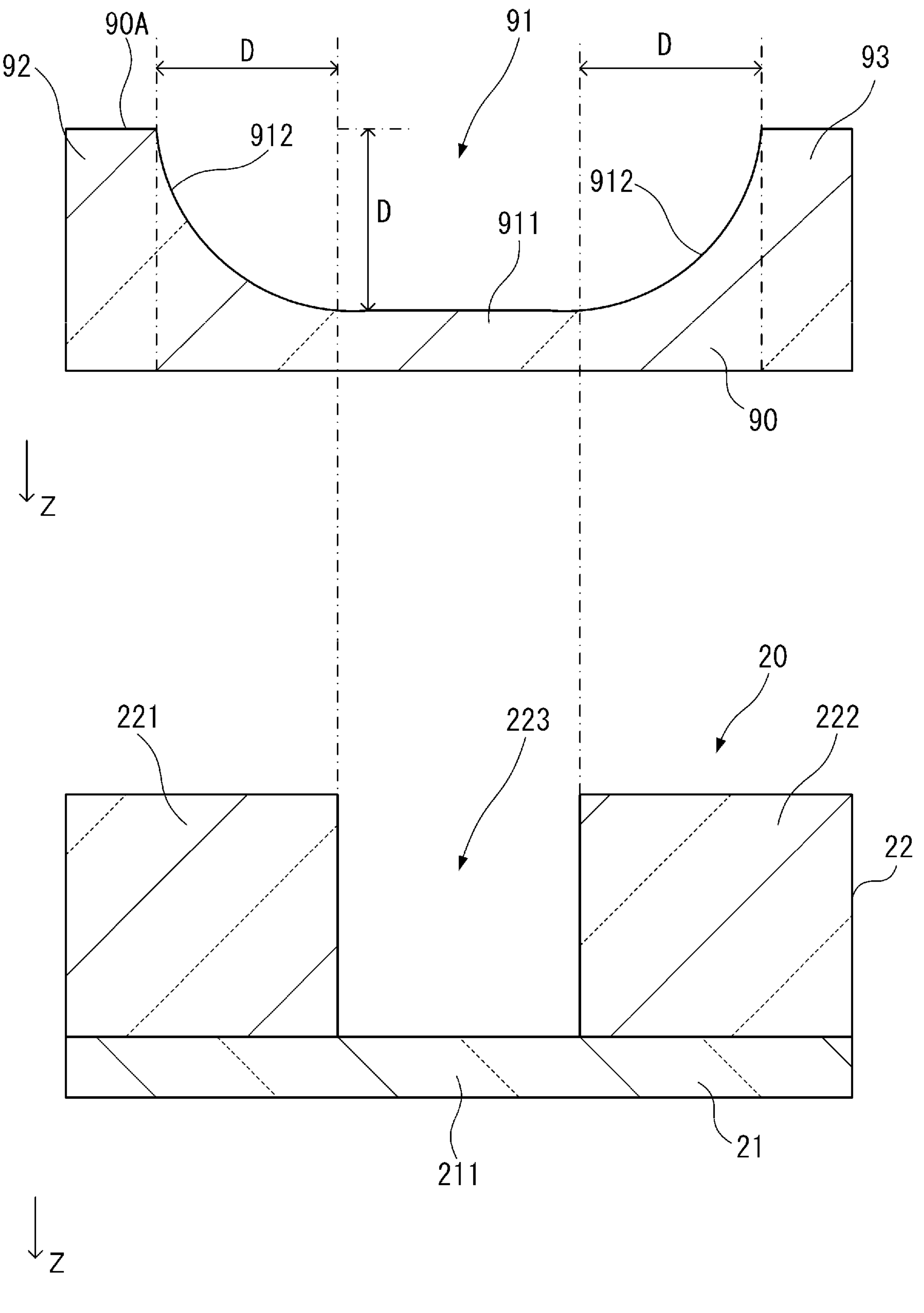
FIG. 6 is an enlarged view of vicinity of a flexible portion of a second substrate according to the first embodiment, and is an enlarged view of vicinity of a diaphragm portion of a second substrate in a comparative example.

FIG. 6 is an enlarged view of vicinity of the flexible portion 211 of the second substrate 20 according to the embodiment, and is an enlarged view of vicinity of a diaphragm portion of a second substrate in a comparative example.

The comparative example is a wavelength interference filter including a first substrate and a second substrate 90, and a configuration of the first substrate is the same as that of the first substrate 10 according to the embodiment. The second substrate 90 according to the comparative example is formed of a single substrate, is formed with a recessed portion 91 by wet etching on a surface (opposite side surface 90A) opposite to the first substrate, and has a bottom portion of the recessed portion 91 functioning as a diaphragm portion 911. In this case, a mask pattern in which a portion corresponding to the diaphragm portion 911 is opened is formed at the opposite side surface 90A, and the recessed portion 91 is formed by isotropic wet etching. However, the etching proceeds not only in the Z direction but also in directions (X and Y directions) orthogonal to the Z direction by the isotropic wet etching (side etching). Therefore, as shown in FIG. 6, in the second substrate 90 according to the comparative example, a recessed curved side wall 912 is formed between the diaphragm portion 911 and a movable portion 92 and between the diaphragm portion 911 and a support portion 93. At this time, a width of the side wall 912, that is, a dimension from the diaphragm portion 911 to the movable portion 92 and a dimension from the diaphragm portion 911 to the support portion 93 are the same dimension as a groove depth D of the recessed portion 91.

Regarding this, in the embodiment, the side wall 224 is parallel to the Z direction. Accordingly, compared to the comparative example, a dimension from the movable portion 221 to the support portion 222 can be shortened by a dimension corresponding to 2D. Since the diaphragm portion 911 according to the comparative example and the flexible portion 211 according to the embodiment surround the outer peripheries of the movable portions 221 and 92, the entire wavelength variable interference filter 1 can be formed to be smaller than that in the comparative example by 4D in the X direction and the Y direction.

When an outer diameter of the wavelength variable interference filter 1 is formed to be a preset specified value, in the comparative example, it is necessary to reduce the dimension of the movable portion 92 or the support portion 93 by 4D. When a planar size of the movable portion 92 is reduced, a cross-sectional area of the optical region C is reduced. When a planar size of the support portion 93 is reduced, a bonding strength between the first substrate and the second substrate 90 decreases.

Regarding this, in the embodiment, since it is not necessary to reduce a planar size of the movable portion 221, the cross-sectional area of the optical region C can be sufficiently secured. Since it is not necessary to reduce the planar size of the support portion 93, a bonding strength between the first substrate 10 and the second substrate 20 can also be sufficiently secured.

Functions and Effects of Embodiment

The wavelength variable interference filter 1 according to the embodiment includes the first substrate 10 having a light-transmitting property, the second substrate 20 having a light-transmitting property and facing the first substrate 10, the first reflective film 31 provided on the surface of the first substrate 10 facing the second substrate 20, and the second reflective film 32 provided on the second substrate 20 and facing the first reflective film 31 via the gap G. The second substrate 20 includes the diaphragm substrate 21 having a uniform thickness in the Z direction and the support substrate 22 bonded to the diaphragm substrate 21 in the Z direction. The support substrate 22 includes the movable portion 221 overlapping the first reflective film 31 and the second reflective film 32, and the support portion 222 provided along the outer peripheral edge of the second substrate 20 in a plan view when viewed from the Z direction, and the hole portion 223 for exposing the diaphragm substrate 21 is provided between the movable portion 221 and the support portion 222.

In the embodiment, by bending the flexible portion 211 exposed from the hole portion 223, the second reflective film 32 provided on the movable portion 221 can be displaced toward the first reflective film 31.

When the diaphragm portion 911 is formed by using wet etching as in the comparative example shown in FIG. 6, the recessed curved side wall 912 is formed around the diaphragm portion 911 by side etching, and a planar size of the diaphragm portion 911 increases accordingly. Regarding this, in the embodiment, since the support substrate 22 provided with the hole portion 223 is bonded to the diaphragm substrate 21, it is not necessary to consider side etching, and the planar size can be reduced.

For example, when the wavelength variable interference filter 1 is incorporated into a spectroscopic camera, it is necessary to receive light transmitted through the optical region C of the wavelength variable interference filter 1 within a predetermined region of an imaging element. In this case, a beam diameter is fixed in advance such that a beam diameter of light transmitted through the wavelength variable interference filter 1 is received in the predetermined region of the imaging element. That is, the size of the movable portion 221 in which the optical region C is provided needs to be a preset specified value (fixed value). Regarding this, in the embodiment, since it is not necessary to consider the width D of the side wall 912 unlike in the comparative example, a planar size of the wavelength variable interference filter 1 can be reduced, and miniaturization of the spectroscopic camera can be promoted.

Alternatively, when a spectroscopic camera is incorporated into a small device such as a portable terminal device, the size of the wavelength variable interference filter 1 that can be incorporated may be fixed to a predetermined specified size in advance. Even in this case, in the embodiment, since it is not necessary to consider the width D of the side wall 912 unlike in the comparative example even when the specified size is small, it is not necessary to reduce a bonding area between the optical region C or the support portion 222 and the diaphragm substrate 21.

In the wavelength variable interference filter 1 according to the embodiment, the diaphragm substrate 21 is disposed to face the first substrate 10, and the support substrate 22 is bonded to the surface of the diaphragm substrate 21 on the side opposite to the first substrate 10. The second reflective film 32 is provided on the surface of the diaphragm substrate 21 facing the first substrate 10 and at a position overlapping the movable portion 221 in the plan view when viewed from the Z direction. The second electrode 42 is further provided on the surface of the diaphragm substrate 21 facing the first substrate 10, and the second electrode 42 is formed to extend from a region overlapping the movable portion 221 to a region overlapping the support portion 222 when viewed from the Z direction.

That is, in the embodiment, since the first electrode 41 is provided to cover the flexible portion 211 having a structure that is easily bent in the diaphragm substrate 21, the thickness of the flexible portion 211 is increased, and it is possible to prevent the inconvenience of bending due to an influence of the film stress of the second reflective film 32 or the second electrode 42 formed at the diaphragm substrate 21.

Even when the film stress of the first electrode 41 acts to cause bending, since the first electrode 41 is provided to cover the entire flexible portion 211, the bending of the flexible portion 211 can be made uniform over the periphery direction.

In the embodiment, low-melting-point glass as a bonding layer for bonding the support substrate 22 and the diaphragm substrate 21 is provided between the support substrate 22 and the diaphragm substrate 21, and the low-melting-point glass has a refractive index the same as that of the support substrate 22 and the diaphragm substrate 21.

Accordingly, it is possible to prevent the inconvenience that the light transmitted through the optical region C is reflected at the interface between the diaphragm substrate 21 and the support substrate 22, and it is possible to reduce an optical loss of light having a predetermined spectral wavelength from the wavelength variable interference filter 1.

Second Embodiment

Next, a second embodiment will be described.

In the first embodiment, an example is shown in which the side wall 224 of the hole portion 223 of the support substrate 22 is perpendicular to the diaphragm substrate 21. Regarding this, the second embodiment is different from the first embodiment in that a side wall of the hole portion 223 is inclined with respect to the diaphragm substrate 21.

In the following description, components the same as those of the first embodiment are denoted by the same reference numerals, and the description thereof is omitted or simplified.

Figure 7:
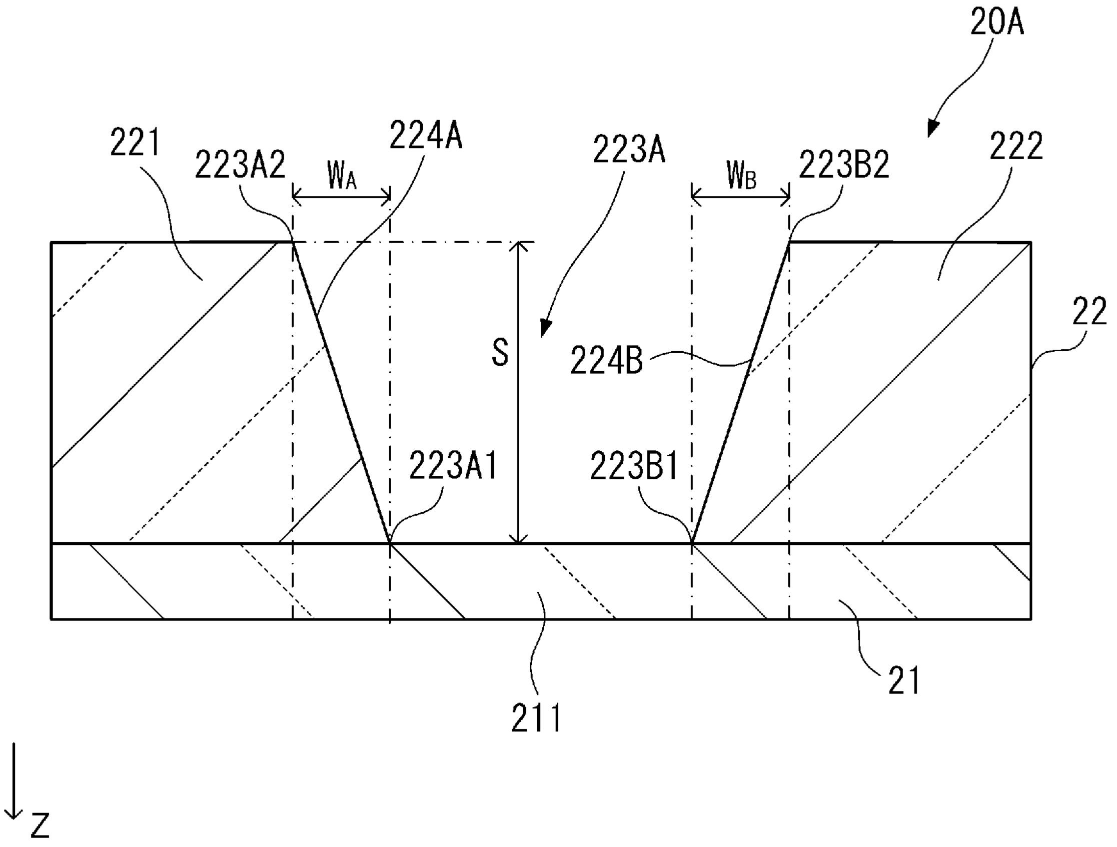
FIG. 7 is a cross-sectional view of vicinity of a flexible portion of a wavelength variable interference filter according to a second embodiment.

FIG. 7 is a cross-sectional view of vicinity of the flexible portion 211 of a wavelength variable interference filter according to the second embodiment.

The embodiment has a configuration substantially the same as the first embodiment, but is different from the first embodiment in a shape of a hole portion 223A provided in the support substrate 22 of a second substrate 20A.

In the embodiment, as shown in FIG. 7, in the hole portion 223A provided in the support substrate 22, a side wall (first inclined portion 224A) on the movable portion 221 side and a side wall (second inclined portion 224B) on the support portion 222 side are inclined with respect to the Z direction.

Here, among opening ends of the hole portion 223A on the diaphragm substrate 21 side, the opening end on the movable portion 221 side is defined as a first inner opening end 223A1, and the opening end on the support portion 222 side is defined as a first outer opening end 223B1. Among opening ends of the hole portion 223A on the side opposite to the diaphragm substrate 21, the opening end on the movable portion 221 side is defined as a second inner opening end 223A2, and the opening end on the support portion 222 side is defined as a second outer opening end 223B2.

The first inclined portion 224A is inclined in a direction away from an outer peripheral edge of the second substrate 20A (on the movable portion 221 side) as the first inclined portion 224A is away from the diaphragm substrate 21. That is, when viewed from the Z direction, the second inner opening end 223A2 is provided further inside the first inner opening end 223A1, and a region from the first inner opening end 223A1 to the second inner opening end 223A2 is the first inclined portion 224A. A width WA from the first inner opening end 223A1 to the second inner opening end 223A2 when viewed from the Z direction is smaller than a thickness S of the support substrate 22.

The second inclined portion 224B is inclined in a direction approaching the outer peripheral edge of the second substrate 20A (on the support portion 222 side) as the second inclined portion 224B is away from the diaphragm substrate 21. That is, when viewed from the Z direction, the second outer opening end 223B2 is provided outside the first outer opening end 223B1, and a region from the first outer opening end 223B1 to the second outer opening end 223B2 is the second inclined portion 224B. A width WB from the first outer opening end 223B1 to the second outer opening end 223B2 when viewed from the Z direction is smaller than the thickness S of the support substrate 22.

Figure 8:
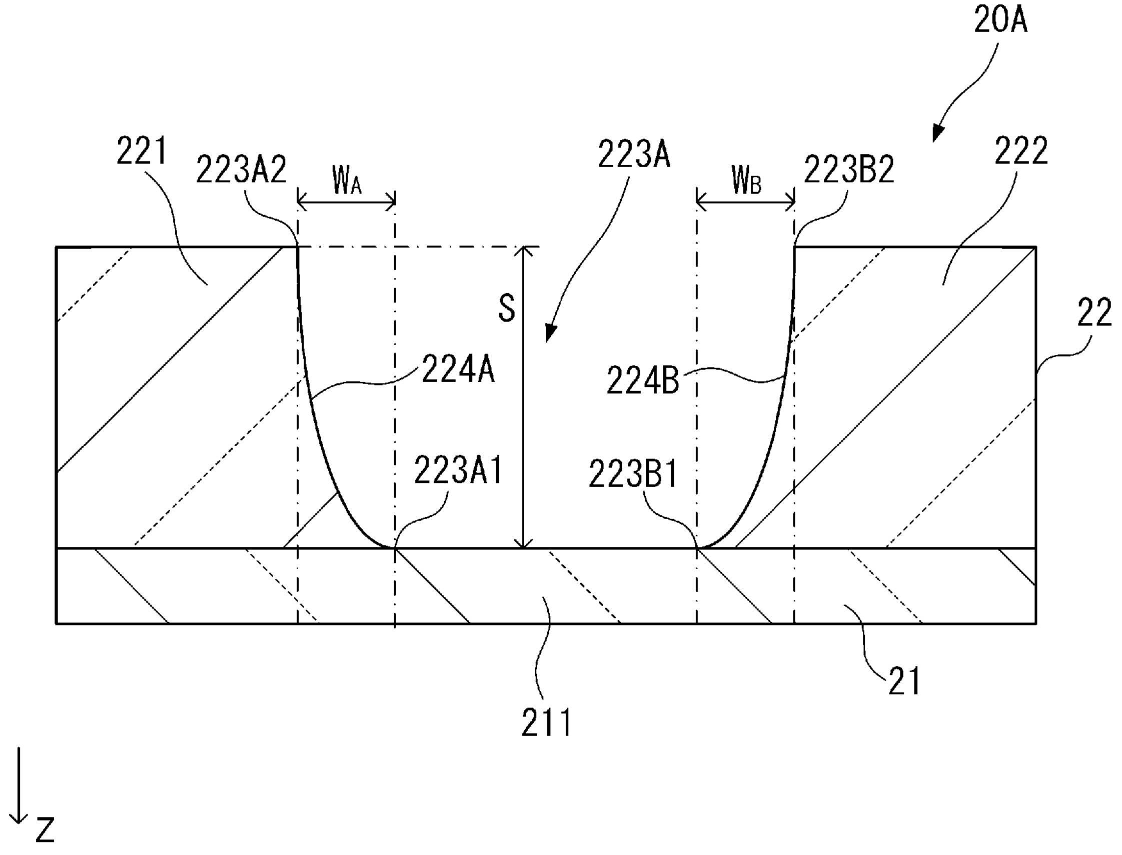
FIG. 8 is a cross-sectional view showing another example of a second substrate according to the second embodiment.

In the example shown in FIG. 7, inclined surfaces of the first inclined portion 224A and the second inclined portion 224B are linear in a cross-sectional view, but the present disclosure is not limited thereto. FIG. 8 is a cross-sectional view showing another example of the second substrate 20A according to the second embodiment.

For example, as shown in FIG. 8, the inclined surfaces of the first inclined portion 224A and the second inclined portion 224B may be formed in a curved shape in the cross-sectional view.

Functions and Effects of Embodiment

In the wavelength variable interference filter according to the embodiment, when viewed from the Z direction, the first inner opening end 223A1 is positioned closer to the outer peripheral edge of the second substrate 20A than the second inner opening end 223A2. The hole portion 223A has the first inclined portion 224A inclined in a direction away from the outer peripheral edge of the second substrate 20 as the first inclined portion 224A is away from the diaphragm substrate 21 from the first inner opening end 223A1 to the second inner opening end 223A2. Then, the width WA from the first inner opening end 223A1 to the second inner opening end 223A2 when viewed from the Z direction is smaller than the thickness S of the support substrate 22.

Similarly, when viewed from the Z direction, the second outer opening end 223B2 is positioned closer to the outer peripheral edge of the second substrate 20A than the first outer opening end 223B1. The hole portion 223A has the second inclined portion 224B inclined in a direction approaching the outer peripheral edge of the second substrate 20A as the second inclined portion 224B is away from the diaphragm substrate 21 from the first outer opening end 223B1 to the second outer opening end 223B2. Then, the width WB from the first outer opening end 223B1 to the second outer opening end 223B2 when viewed from the Z direction is smaller than the thickness S of the support substrate 22.

Accordingly, breakage of the diaphragm substrate 21 can be prevented.

That is, when the first inclined portion 224A and the second inclined portion 224B are perpendicular to the diaphragm substrate 21, a stress concentrates on the boundaries with the side walls (the first inclined portion 224A and the second inclined portion 224B) when the flexible portion 211 is deformed. This is because a boundary between a portion of the diaphragm substrate 21 overlapping the movable portion 221 and the flexible portion 211 and a boundary between a portion of the diaphragm substrate 21 overlapping the support portion 222 and the flexible portion 211 are positions where a force against the stress increases rapidly with respect to the flexible portion 211 that is to be deformed by the stress, and the concentration of the stress on the boundary may cause a crack in the diaphragm substrate 21 or cause separation between the diaphragm substrate 21 and the support substrate 22. Although it is possible to prevent breakage of the diaphragm substrate 21 by limiting the deformation amount of the flexible portion 211, in this case, a selection range of the spectral wavelength (spectral wavelength region) is narrowed by the wavelength variable interference filter. By increasing the thickness of the diaphragm substrate 21, the breakage of the diaphragm substrate 21 can also be prevented, but the flexible portion 211 is less likely to bend.

Regarding this, in the embodiment, the sides of the first inclined portion 224A and the second inclined portion 224B that are close to the flexible portion 211 having a thickness smaller than those of the sides that are far from the flexible portion 211. Therefore, the sides of the first inclined portion 224A and the second inclined portion 224B are easily deformed following the bending deformation of the flexible portion 211, and are less likely to be gradually deformed as the first inclined portion 224A and the second inclined portion 224B are away from the flexible portion 211. In this case, an excessive stress is not concentrated on the boundary between the flexible portion 211 and the first inclined portion 224A and the boundary between the flexible portion 211 and the second inclined portion 224B, and the breakage of the diaphragm substrate 21 can be prevented.

Third Embodiment

Next, a third embodiment will be described.

In the first embodiment, an example is shown in which the diaphragm substrate 21 and the support substrate 22 are bonded to each other using the low-melting-point glass having a refractive index the same as that of the diaphragm substrate 21 and the support substrate 22.

Regarding this, in the third embodiment, an example is shown in which the diaphragm substrate 21 and the support substrate 22 are directly bonded to each other and bonded to each other by another bonding member.

Figure 9:
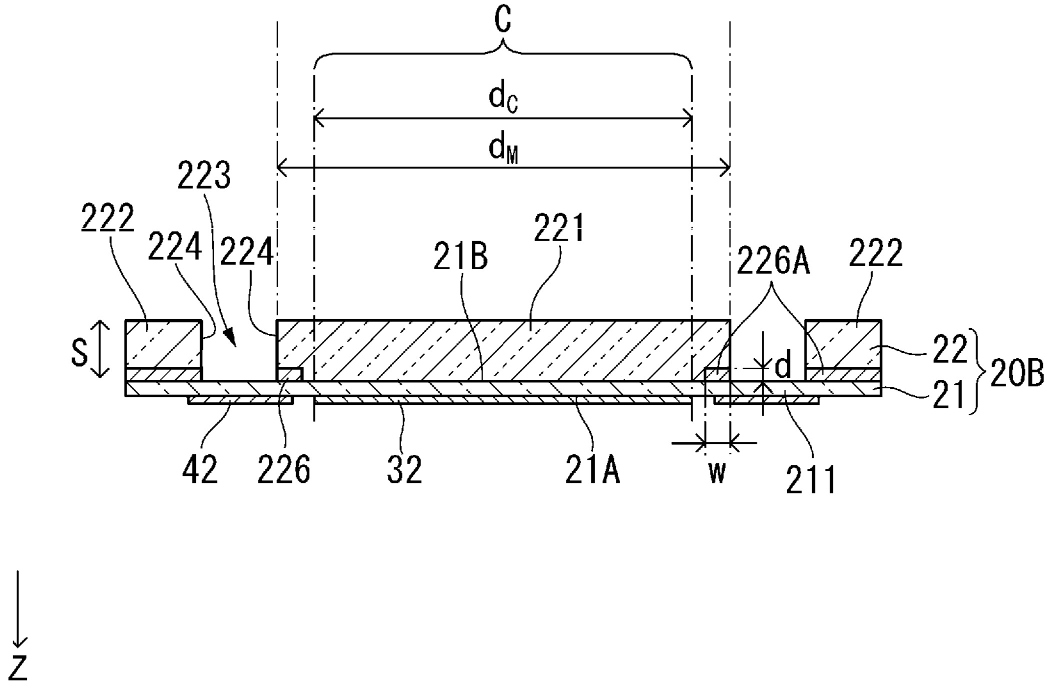
FIG. 9 is a cross-sectional view showing a schematic configuration in vicinity of a flexible portion on a second substrate according to a third embodiment.
Figure 10:
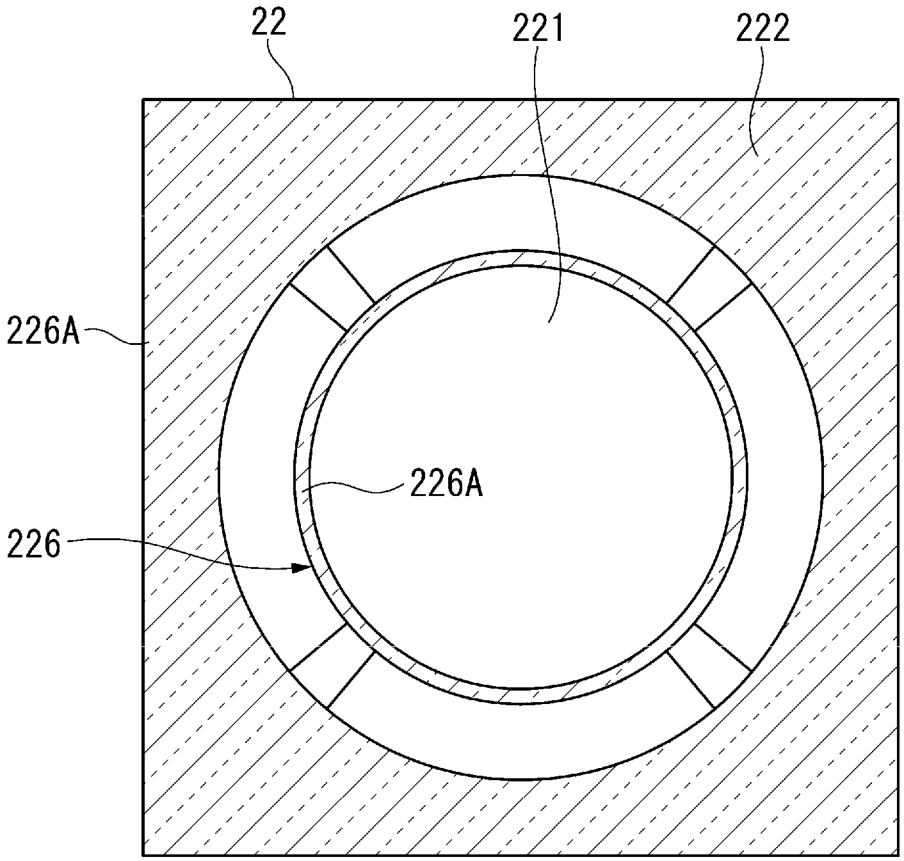
FIG. 10 is a plan view showing a disposition position of a bonding member on a support substrate according to the third embodiment.

FIG. 9 is a cross-sectional view showing a schematic configuration in vicinity of the flexible portion 211 on a second substrate 20B according to the embodiment. FIG. 10 is a plan view showing a position of a bonding member 226A on the support substrate 22 according to the embodiment.

The second substrate 20B according to the embodiment includes the diaphragm substrate 21 and the support substrate 22 as in the first embodiment. The support substrate 22 includes the movable portion 221 and the support portion 222.

In the embodiment, a recessed groove portion 226 is formed in the surface of the movable portion 221 on the diaphragm substrate 21 side and along the outer peripheral edge of the movable portion 221, and the diaphragm substrate 21 and the support substrate 22 are bonded to each other by filling the recessed groove portion 226 with the bonding member 226A.

As shown in FIGS. 9 and 10, a position of the recessed groove portion 226 may be formed over the entire periphery of the outer peripheral edge of the movable portion 221, or a plurality of recessed groove portions 226 may be formed at regular intervals along the outer peripheral edge.

A groove depth d of the recessed groove portion 226, that is, a depth in the Z direction is not particularly limited as long as the bonding member 226A can be inserted into the recessed groove portion 226. That is, when the thickness of the support substrate 22 is S, $d<S$.

On the other hand, in a plan view when viewed from the Z direction, a width w of the recessed groove portion 226 along a radial direction with respect to a center of the movable portion 221, that is, a distance between the outer peripheral edge of the movable portion 221 and an end portion of the recessed groove portion 226 on a side away from the outer peripheral edge of the movable portion 221 is formed such that the recessed groove portion 226 does not overlap an optical path of the light transmitted through the optical region C. When a diameter of the optical region C is de and a diameter of the movable portion 221 is $d_M$, $2w+d_C \leq d_M$.

That is, the recessed groove portion 226 and the bonding member 226A filled in the recessed groove portion 226 are formed to have a width according to the cross-sectional area of the optical region C so as not to overlap the optical region C.

The bonding member 226A filled in the recessed groove portion 226 is not particularly limited as long as the support substrate 22 and the diaphragm substrate 21 can be bonded to each other by the bonding member 226A. For example, low-melting-point glass as in the first embodiment may be used, or an adhesive or the like having a refractive index different from those of the diaphragm substrate 21 and the support substrate 22 may be used.

The bonding member 226A may not have a light-transmitting property. In this case, the bonding member 226A disposed along the outer peripheral edge of the movable portion 221 may function as an aperture.

In the embodiment, the support substrate 22 is directly bonded to the diaphragm substrate 21 on an inner side of the recessed groove portion 226 with respect to the movable portion 221, that is, in a region overlapping the optical region C. The direct bonding described here is bonding by directly superimposing a plane of the support substrate 22 on a plane of the diaphragm substrate 21. Specifically, an optical contact for bonding surfaces of the mirror-polished diaphragm substrate 21 and support substrate 22 to each other, plasma activation bonding for activating and bonding the surfaces of the substrates by plasma irradiation, or the like can be exemplified.

In such direct bonding by optical contact or plasma activation bonding, no air layer is formed between the movable portion 221 and the diaphragm substrate 21, and light reflection at the bonding interface can be prevented.

The bonding between the support portion 222 and the diaphragm substrate 21 is not particularly limited, and may be direct bonding or bonding using the bonding member 226A such as an adhesive. In the example shown in FIG. 9, the support portion 222 and the diaphragm substrate 21 are bonded to each other by using the bonding member 226A. In this case, a surface of the support portion 222 facing the diaphragm substrate 21 is polished or the like to be formed thinner than a portion of the movable portion 221 corresponding to the optical region C. For example, when a surface of the movable portion 221 corresponding to the optical region C is in contact with the diaphragm substrate 21, polishing is performed such that a gap having the dimension d is formed between the support portion 222 and the diaphragm substrate 21. Accordingly, a space for filling with the bonding member 226A can be formed between the support portion 222 and the diaphragm substrate 21.

Similar to the movable portion 221, a recessed groove portion may be formed in a part or the entire periphery of the outer peripheral edge of the support portion 222, and may be filled with the bonding member 226A for bonding. In this case, a central portion of the support portion 222, that is, an inner region with respect to the recessed groove portion may be bonded by direct bonding such as optical contact or plasma activation bonding.

Functions and Effects of Embodiment

In the embodiment, in the support substrate 22, a part along the outer peripheral edge of the movable portion 221 and the support portion 222 are bonded to the diaphragm substrate 21 by the bonding member 226A.

Accordingly, the diaphragm substrate 21 and the support substrate 22 can be bonded to each other. Since the bonding member 226A is not provided in the optical region C, the light transmitted through the optical region C is not blocked by the bonding member 226A, and light having a desired spectral wavelength can be suitably emitted from the wavelength variable interference filter.

In the embodiment, the support substrate 22 is provided with the recessed groove portion 226 recessed in a direction away from the diaphragm substrate 21 and filled with the bonding member 226A on the surface facing the diaphragm substrate 21.

Accordingly, since the bonding member 226A is disposed in the recessed groove portion 226 along the outer peripheral edge of the movable portion 221, the surface of the movable portion 221 corresponding to the optical region C can be in contact with the diaphragm substrate 21. Accordingly, in the optical region C, no air layer is formed between the movable portion 221 and the diaphragm substrate 21, and light reflection at an interface between the air layer and the diaphragm substrate 21 and at an interface between the air layer and the movable portion 221 can be prevented.

Further, in the embodiment, the movable portion 221 and the diaphragm substrate 21 are directly bonded to each other in the optical region C.

Accordingly, the movable portion 221 and the diaphragm substrate 21 in the optical region C can be bonded to each other, and the inconvenience due to the formation of the air layer can be further prevented.

MODIFICATION

The present disclosure is not limited to the above embodiments, and modifications, improvements, or the like within a scope that can achieve the object of the present disclosure are in the present disclosure.

Modification 1

In the third embodiment, an example is shown in which the recessed groove portion 226 is filled with the bonding member 226A, and the diaphragm substrate 21 and the movable portion 221 are directly bonded to each other in a portion facing the optical region C on the inner side of the recessed groove portion 226. Alternatively, for example, entire surfaces of the diaphragm substrate 21 and the support substrate 22 may be directly bonded to each other.

The recessed groove portion 226 may not be provided, the outer peripheral edge of the movable portion 221 may be bonded to the diaphragm substrate 21 by the bonding member 226A, and the portion of the movable portion 221 corresponding to the optical region C may be bonded by a bonding layer having a refractive index the same as that of the diaphragm substrate 21 and the support substrate 22, such as low-melting-point glass, as in the first embodiment.

Modification 2

In the third embodiment, the side wall 224 of the hole portion 223 of the support substrate 22 is perpendicular to the diaphragm substrate 21 as in the first embodiment, but the present disclosure is not limited thereto. As in the second embodiment, the hole portion 223A having the first inclined portion 224A and the second inclined portion 224B may be provided.

Modification 3

In the above embodiments, the diaphragm substrate 21 is disposed on the first substrate 10 side, and the support substrate 22 is disposed on the side of the diaphragm substrate 21 opposite to the first substrate 10. Alternatively, the support substrate 22 may be disposed on the first substrate 10, and the diaphragm substrate 21 may be bonded to the support substrate 22 on the side opposite to the first substrate 10.

In this case, the second reflective film 32 can be provided on the surface of the movable portion 221 of the support substrate 22 facing the first substrate 10. The second electrode 42 may be provided on the surface of the diaphragm substrate 21 opposite to the support substrate 22, or may be provided on the surface of the flexible portion 211 facing the first substrate 10.

SUMMARY OF PRESENT DISCLOSURE

A wavelength variable interference filter according to an aspect of the present disclosure includes: a first substrate having a light-transmitting property; a second substrate facing the first substrate and having a light-transmitting property; a first reflective film provided on a surface of the first substrate facing the second substrate; and a second reflective film provided on the second substrate and facing the first reflective film via a gap. A direction from the first substrate toward the second substrate is defined as a thickness direction. The second substrate includes a diaphragm substrate having a uniform thickness in the thickness direction and a support substrate bonded to the diaphragm substrate in the thickness direction. The support substrate includes a movable portion overlapping the first reflective film and the second reflective film when viewed from the thickness direction, and a support portion provided along an outer peripheral edge of the second substrate, and a hole portion for exposing the diaphragm substrate is provided between the movable portion and the support portion.

Accordingly, by bending the diaphragm substrate exposed from the hole portion, the second reflective film provided on the movable portion can be displaced toward the first reflective film. Compared to a configuration in which a diaphragm is formed by wet etching in which side etching occurs, a relative size of the entire wavelength variable interference filter with respect to a size of the movable portion in which a reflective film is disposed can be reduced.

That is, even when it is necessary to set a beam diameter of light transmitted through the first reflective film and the second reflective film to a predetermined specified value, miniaturization of the wavelength variable interference filter can be achieved. Even when it is necessary to set a planar size of the wavelength variable interference filter to a predetermined specified size, it is not necessary to reduce a planar size of the movable portion or the second reflective film provided on the movable portion, and a wavelength variable interference filter having a desired beam diameter can be obtained.

In the wavelength variable interference filter according to the aspect, an opening end of the hole portion on a movable portion side among opening ends of the hole portion on a diaphragm substrate side may be defined as a first inner opening end, and an opening end of the hole portion on the movable portion side among opening ends of the hole portion on a side opposite to the diaphragm substrate may be defined as a second inner opening end. When viewed from the thickness direction, the first inner opening end may be positioned closer to an outer peripheral edge of the second substrate than the second inner opening end. The hole portion may have a first inclined portion inclined in a direction away from the outer peripheral edge of the second substrate as the first inclined portion is away from the diaphragm substrate from the first inner opening end to the second inner opening end. A width from the first inner opening end to the second inner opening end when viewed from the thickness direction may be smaller than a thickness of the support substrate.

In the aspect, even when the first inclined portion is provided in the hole portion, the width from the first inner opening end to the second inner opening end (a width in a plane direction orthogonal to the thickness direction) when viewed from the thickness direction is smaller than the thickness of the support substrate. Accordingly, for example, it is possible to reduce the relative size of the entire wavelength variable interference filter with respect to the size of the movable portion in which the reflective film is disposed, as compared with the configuration in which a bottom portion of a recessed portion formed by wet etching is used as the diaphragm.

When a portion (a flexible portion) of the diaphragm substrate exposed from the hole portion is bent, the side of the first inclined portion approaching the flexible portion is deformable following the flexible portion, and stress concentration in a portion of the diaphragm substrate in contact with the first inner opening end can be prevented. Accordingly, breakage of the diaphragm substrate can be prevented.

In the wavelength variable interference filter according to the aspect, an opening end of the hole portion on a support portion side among opening ends of the hole portion on a diaphragm substrate side may be defined as a first outer opening end, and an opening end of the hole portion on the support portion side among opening ends of the hole portion on a side opposite to the diaphragm substrate may be defined as a second outer opening end. When viewed from the thickness direction, the second outer opening end may be positioned closer to an outer peripheral edge of the second substrate than the first outer opening end. The hole portion may have a second inclined portion inclined in a direction approaching the outer peripheral edge of the second substrate as the second inclined portion is away from the diaphragm substrate from the first outer opening end to the second outer opening end. A width from the first outer opening end to the second outer opening end when viewed from the thickness direction may be smaller than a thickness of the support substrate.

Similar to the above aspect in this case, even when the second inclined portion is provided in the hole portion, the width from the first outer opening end to the second outer opening end when viewed from the thickness direction is smaller than the thickness of the support substrate. Accordingly, for example, it is possible to reduce the relative size of the entire wavelength variable interference filter with respect to the size of the movable portion in which the reflective film is disposed, as compared with the configuration in which a bottom portion of a recessed portion formed by wet etching is used as the diaphragm.

When a portion (a flexible portion) of the diaphragm substrate exposed from the hole portion is bent, the side of the second inclined portion approaching the flexible portion is deformable following the flexible portion, and stress concentration in a portion of the diaphragm substrate in contact with the first outer opening end can be prevented. Accordingly, breakage of the diaphragm substrate can be prevented.

In the wavelength variable interference filter according to the aspect, the diaphragm substrate is disposed to face the first substrate, the support substrate is bonded to a surface of the diaphragm substrate on a side opposite to the first substrate, the second reflective film is provided on a surface of the diaphragm substrate facing the first substrate and at a position overlapping the movable portion when viewed from the thickness direction, an electrode is further provided on the surface of the diaphragm substrate facing the first substrate, and the electrode is formed to extend from a region overlapping the movable portion to a region overlapping the support portion when viewed from the thickness direction.

The flexible portion of the diaphragm substrate, which is exposed from the hole portion, is more likely to bend than a portion where the movable portion and the support portion are stacked, and is more likely to be influenced by a film stress of a film material formed at the diaphragm substrate. Regarding this, by forming the electrode to cover the flexible portion, the flexible portion can be reinforced, and bending due to the film stress can be prevented. Even when a film stress is applied by the electrode, since the flexible portion is covered with the electrode over a periphery direction, the film stress applied to the flexible portion is uniform, and inclination of the movable portion and the second reflective film can be prevented.

In the wavelength variable interference filter according to the aspect, in the support substrate, a part of the movable portion along an outer peripheral edge and the support portion may be bonded to the diaphragm substrate by a bonding member.

Since the second reflective film is formed in a central portion of the movable portion, when the bonding member is provided in this portion, light having a predetermined wavelength and transmitted through the first reflective film and the second reflective film is reflected on a boundary between the diaphragm substrate and the bonding member or a boundary between the support substrate and the bonding member, and an amount of light emitted from the wavelength variable interference filter decreases. Regarding this, in the aspect, the outer peripheral edge of the movable portion and the support portion are bonded to the diaphragm substrate by the bonding member, so that the light transmitted through the first reflective film and the second reflective film is not influenced, and it is possible to prevent inconvenience that the amount of light emitted from the wavelength variable interference filter decreases.

In the wavelength variable interference filter according to the aspect, the support substrate may have, on a surface facing the diaphragm substrate, a recessed groove portion recessed in a direction away from the diaphragm substrate and filled with the bonding member.

In this case, since the recessed groove portion filled with the bonding member is provided along the outer peripheral edge of the movable portion, it is possible to prevent inconvenience that a gap is generated between the central portion of the movable portion and the diaphragm substrate.

In the wavelength variable interference filter according to the aspect, a bonding layer that bonds the support substrate and the diaphragm substrate may be provided between the support substrate and the diaphragm substrate, and the bonding layer may have a refractive index same as a refractive index of the support substrate and the diaphragm substrate.

In the aspect, the support substrate and the diaphragm substrate are bonded to each other by using a bonding layer having a refractive index the same as that of the support substrate and the diaphragm substrate. Therefore, even when the bonding layer is provided in the central portion of the movable portion passing through the first reflective film and the second reflective film, light reflection on a boundary between the diaphragm substrate and the bonding layer and on a boundary between the support substrate and the bonding layer can be prevented.

In the wavelength variable interference filter according to the aspect, the support substrate and the diaphragm substrate may be directly bonded to each other.

In the aspect, since another layer having a refractive index different from that of an air layer is not interposed between the diaphragm substrate and the support substrate, light reflection occurring on a boundary with the other layer can be prevented.

What is claimed is:

1. A wavelength variable interference filter, comprising:
- a first substrate having a light-transmitting property;
- a second substrate facing the first substrate and having a light-transmitting property;
- a first reflective film provided on a surface of the first substrate facing the second substrate; and
- a second reflective film provided on the second substrate and facing the first reflective film via a gap, wherein
  - a direction from the first substrate toward the second substrate is defined as a thickness direction,
  - the second substrate includes a diaphragm substrate having a uniform thickness in the thickness direction and a support substrate bonded to the diaphragm substrate in the thickness direction,
  - an electrode is provided on a surface of the diaphragm substrate that faces the first substrate,
  - the support substrate includes a movable portion overlapping the first reflective film and the second reflective film when viewed from the thickness direction, and a support portion provided along an outer peripheral edge of the second substrate, and a hole portion for exposing the diaphragm substrate is provided between the movable portion and the support portion,
  - a portion of the diaphragm substrate exposed from the hole portion is a flexible portion,
  - the electrode is formed in a circular ring shape, and
  - the electrode is formed to extend from the movable portion to the support portion to cover the flexible portion exposed from the hole portion.

2. The wavelength variable interference filter according to claim 1, wherein
- an opening end of the hole portion on a movable portion side among opening ends of the hole portion on a diaphragm substrate side is defined as a first inner opening end, and an opening end of the hole portion on the movable portion side among the opening ends of the hole portion on a side opposite to the diaphragm substrate is defined as a second inner opening end, when viewed from the thickness direction, the first inner opening end is positioned closer to the outer peripheral edge of the second substrate than the second inner opening end, the hole portion has a first inclined portion inclined in a direction away from the outer peripheral edge of the second substrate as the first inclined portion is away from the diaphragm substrate from the first inner opening end to the second inner opening end, and a width from the first inner opening end to the second inner opening end when viewed from the thickness direction is smaller than a thickness of the support substrate.

3. The wavelength variable interference filter according to claim 1, wherein an opening end of the hole portion on a support portion side among opening ends of the hole portion on a diaphragm substrate side is defined as a first outer opening end, and an opening end of the hole portion on the support portion side among the opening ends of the hole portion on a side opposite to the diaphragm substrate is defined as a second outer opening end, when viewed from the thickness direction, the second outer opening end is positioned closer to the outer peripheral edge of the second substrate than the first outer opening end, the hole portion has a second inclined portion inclined in a direction approaching the outer peripheral edge of the second substrate as the second inclined portion is away from the diaphragm substrate from the first outer opening end to the second outer opening end, and a width from the first outer opening end to the second outer opening end when viewed from the thickness direction is smaller than a thickness of the support substrate.

4. The wavelength variable interference filter according to claim 1, wherein the diaphragm substrate is disposed to face the first substrate, the support substrate is bonded to a surface of the diaphragm substrate on a side opposite to the first substrate, the second reflective film is provided on the surface of the diaphragm substrate facing the first substrate and at a position overlapping the movable portion when viewed from the thickness direction, and the electrode is formed to extend from a region overlapping the movable portion to a region overlapping the support portion when viewed from the thickness direction.

5. The wavelength variable interference filter according to claim 1, wherein in the support substrate, a part of the movable portion along an outer peripheral edge and the support portion are bonded to the diaphragm substrate by a bonding member.

6. The wavelength variable interference filter according to claim 5, wherein the support substrate has, on a surface facing the diaphragm substrate, a recessed groove portion recessed in a direction away from the diaphragm substrate and filled with the bonding member.

7. The wavelength variable interference filter according to claim 1, wherein a bonding layer that bonds the support substrate and the diaphragm substrate is provided between the support substrate and the diaphragm substrate, and the bonding layer has substantially a refractive index same as a refractive index of the support substrate and the diaphragm substrate.

8. The wavelength variable interference filter according to claim 1, wherein the support substrate is directly bonded to the diaphragm substrate.

9. The wavelength variable interference filter according to claim 1, further comprising an extraction electrode coupled to the electrode.

* * * * *